(12) United States Patent
Bando (10) Patent No.: US 7,059,938 B2
(45) Date of Patent: Jun. 13, 2006

(54) METHOD OF AND APPARATUS FOR WORKING A GLASS PLATE

(75) Inventor: Kazuaki Bando, Tokushima (JP)

(73) Assignee: Bando Kiko Co., Ltd., Tokushima (JP)

(*) Notice: Subject to any disclaimer, the term of this patent is extended or adjusted under 35 U.S.C. 154(b) by 397 days.

(21) Appl. No.: 10/275,490

(22) PCT Filed: Mar. 30, 2001

(86) PCT No.: PCT/JP01/02715

§ 371 (c)(1),
(2), (4) Date: Nov. 6, 2002

(87) PCT Pub. No.: WO02/081391

PCT Pub. Date: Oct. 17, 2002

(65) Prior Publication Data

US 2003/0115906 A1    Jun. 26, 2003

(51) Int. Cl.
*B24B 1/00* (2006.01)

(52) U.S. Cl. ................ 451/12; 451/70; 451/335; 451/336; 451/44

(58) Field of Classification Search ............ 451/5, 451/12, 14, 44, 67, 70, 355, 38, 335, 338, 451/336

See application file for complete search history.

(56) References Cited

U.S. PATENT DOCUMENTS

| | | | |
|---|---|---|---|
| 5,138,963 A | * | 8/1992 | Eichert ............... 114/222 |
| 5,396,736 A | * | 3/1995 | Bando .................. 451/5 |
| 5,616,064 A | | 4/1997 | Bando |
| 6,461,223 B1 | * | 10/2002 | Bando ................. 451/12 |
| 6,743,083 B1 | * | 6/2004 | Bando ................. 451/190 |

FOREIGN PATENT DOCUMENTS

| | | |
|---|---|---|
| EP | 1020412 A1 | 7/2000 |
| JP | 2-47200 U | 3/1990 |
| JP | 3-5334 A | 1/1991 |
| JP | 7-40247 | 2/1995 |
| JP | 9-70743 | 3/1997 |

* cited by examiner

*Primary Examiner*—George Nguyen
(74) *Attorney, Agent, or Firm*—Nixon & Vanderhye P.C.

(57) ABSTRACT

An apparatus (1) for working a glass plate includes: a glass-plate working section (4) for working a glass plate (2) whose upper surface (3) is coated; and transporting means (6) for carrying into the glass-plate working section (4) the glass plate (2) to be worked and carrying it out from the glass-plate working section (4) after working, by imparting to a lower surface (5) thereof a moving force in an X direction parallel to the upper surface (3) and the lower surface (5) of the glass plate (2).

13 Claims, 11 Drawing Sheets

METHOD OF AND APPARATUS FOR WORKING A GLASS PLATE

This application is the US national phase of international application PCT/JP01/02715 filed 30 Mar. 2001, which designated the US.

TECHNICAL FIELD

The present invention relates to a method of and an apparatus for working a glass plate which is used in an automobile, a general building, and the like, preferably a glass plate whose one surface is coated (on which a coating layer has been formed) by sputtering or the like.

BACKGROUND ART

A conventional glass-plate working apparatus is so arranged that an upper surface of a glass plate is sucked under a vacuum by a vacuum suction unit and is thereby held, the glass plate thus held is raised by an air cylinder unit, and this glass plate is moved in one direction so as to be carried into and out from a work section.

However, in a case where the glass plate is worked by using the above-described glass-plate working apparatus, since the upper surface of the glass plate is sucked under a vacuum by the vacuum suction unit and is thereby held, there is the possibility of the glass plate dropping down when the glass plate with its upper surface sucked is raised by the air cylinder unit.

In addition, in the case of working a glass plate whose upper surface is coated, since the upper surface (hereafter referred to as the coated surface) of the glass plate is sucked under a vacuum by the vacuum suction unit and is thereby held, a powerful suction force is applied to the coated surface of that glass plate. Accordingly, there is the possibility of damage or the like being caused to the coated surface of the glass plate.

The present invention has been devised in view of the above-described circumstances, and its object is to provide a method of and an apparatus for working a glass plate which makes it possible to prevent the dropping of the glass plate at the time of the carrying in and out of the glass plate, and which make it possible to prevent damage or the like from being caused to the coated surface at the time of working the glass plate whose upper surface is coated.

DISCLOSURE OF THE INVENTION

In the method of working a glass plate in accordance with the present invention, a glass plate to be worked is carried into a glass-plate working section for working the glass plate, by imparting a moving force in one direction to a lower surface thereof, and the glass plate is carried out from the glass-plate working section after working. It should be noted that, as for the glass plate which is worked by the method of working a glass plate in accordance with the present invention, its upper surface may be coated.

According to the method of working a glass plate in accordance with the present invention, since the glass plate is carried in and out by imparting a moving force in one direction to the lower surface of the glass plate, it is possible to prevent the dropping of the glass plate at the time of the carrying in and out of the glass plate, and it is possible to prevent damage or the like from being caused to the coated surface at the time of working the glass plate whose upper surface is coated.

The apparatus for working a glass plate in accordance with the present invention comprises: a glass-plate working section for working a glass plate; and transporting means for carrying into the glass-plate working section the glass plate to be worked by imparting a moving force in one direction to a lower surface thereof, and for carrying out the glass plate from the glass-plate working section after working. It should be noted that, as for the glass plate which is worked by the apparatus for working a glass plate in accordance with the present invention, its upper surface may be coated.

According to the apparatus for working a glass plate in accordance with the present invention, since the glass plate is carried in and out by the transporting means by imparting a moving force in one direction to the lower surface of the glass plate, it is possible to prevent the dropping of the glass plate at the time of the carrying in and out of the glass plate, and it is possible to prevent damage or the like from being caused to the coated surface at the time of working the glass plate whose upper surface is coated.

The glass-plate working section of the apparatus for working a glass plate in accordance with the present invention preferably has at least one work section of a cutting work section for forming a cut line on the glass plate, a bend-breaking work section for bend-breaking along the cut line the glass plate on which the cut line have been formed, and a grinding work section for grinding a peripheral edge of the bend-broken glass plate, wherein, preferably, the transporting means of the apparatus for working a glass plate is disposed in such a manner as to penetrate a center of the glass-plate working section, and is adapted to carry into the work section the glass plate in a state of being held at a center of the lower surface thereof and to carry out the worked glass plate from the work section in synchronism with the carrying in. Since this transporting means is adapted to carry into the work section the glass plate to be worked and carry out the worked glass plate from the work section in synchronism with the carrying in, it is possible to shorten the time required for the carrying in and out of the glass plate.

Preferably, the cutting work section, the bend-breaking work section, and the grinding work section of the apparatus for working a glass plate in accordance with the present invention respectively have supporting means for supporting the glass plate, and each of the supporting means has a pair of supporting devices opposing each other with the transporting means placed therebetween.

The cutting work section of the apparatus for working a glass plate in accordance with the present invention is preferably adapted to form a main cut line and an edge cut line on the glass plate, and the edge cut line is adapted to be formed in an area of the glass plate located between at least the pair of supporting devices. Since this cutting work section is adapted to form the edge cut line in the area of the glass plate located between at least the pair of supporting devices, the cullet of the glass plate bend-broken in the bend-breaking work section does not remain on the transporting means disposed between the pair of supporting devices, and the cullet can be discharged.

Preferably, the pair of supporting devices of at least one of the cutting work section and the bend-breaking work section of the apparatus for working a glass plate in accordance with the present invention respectively have endless belts on which the glass plate is placed and traveling means for causing the endless belts to travel in one direction.

Preferably, the cutting work section and the bend-breaking section of the apparatus for working a glass plate in accordance with the present invention mutually share the endless belt of each of the pair of supporting devices, and are respectively adapted to form the main cut line and the edge cut line on the glass plate placed in a cutting work area on the endless belts of the cutting work section, and to bend-break along the main cut line the glass plate on which the main cut line and the edge cut line have been formed and which is placed in a bend-breaking work area on the endless belts of the bend-breaking work section.

In addition, in the present invention, preferably, when the glass plate is carried into and out from the cutting work section and the bend-breaking work section, transporting by the transporting means and traveling of the endless belts disposed on both sides of the transporting means are adapted to proceed synchronously and proceed at the same speed. Furthermore, when the glass plate is carried into and out from the cutting work section and the bend-breaking work section, the endless belts disposed on both sides of the transporting means are adapted to support the glass plate and transport and carry in the glass plate together with the transporting means.

The transporting means of the apparatus for working a glass plate in accordance with the present invention preferably has holding means for holding the glass plate from the lower surface thereof and moving means for moving the holding means in one direction. Since the transporting means has the holding means for holding the glass plate from the lower surface thereof and the moving means for moving the holding means in one direction, the glass plate does not drop when the glass plate is carried in or out.

The transporting means of the apparatus for working a glass plate in accordance with the present invention preferably has vertically moving means for raising or lowering the holding means. Since this transporting means has the vertically moving means for raising or lowering the glass plate held by the holding means, the lower surface of the glass plate does not interfere with the pair of supporting devices and can be transported smoothly.

In addition, in accordance with the present invention, the grinding work section preferably has vacuum suction units disposed on both sides of a passage of the transporting means in a sandwiching manner, and the glass plate is adapted to be fixed by the vacuum suction units on both sides at the time of the grinding working.

Hereafter, a more detailed description will be given of an embodiment of the present invention on the basis of preferred examples illustrated in the drawings. It should be noted that the present invention is not limited to these examples.

EMBODIMENTS

In FIGS. 1 to 11, a glass-plate working apparatus 1 of this embodiment includes a glass-plate working section 4 for working a glass plate 2 whose upper surface 3 has been coated by sputtering, as well as a transporting means 6 for carrying into the glass-plate working section 4 the glass plate 2 to be worked and carrying it out from the glass-plate working section 4 after working, by imparting to its lower surface 5 a moving force in an X direction parallel to the upper surface 3 and the lower surface 5 of the glass plate 2.

The glass-plate working section 4 includes a cutting work section 8 for forming cut lines 7 on the glass plate 2, a bend-breaking work section 9 for bend-breaking along the cut lines 7 the glass plate 2 on which the cut lines 7 have been formed, and a grinding work section 11 for grinding peripheral edges 10 of the bend-broken glass plate 2. The glass-plate working section 4 further includes a supporting means 26 for temporarily supporting the glass plate 2 which has been carried out from the bend-breaking work section 9.

It should be noted that the glass-plate working apparatus 1 may be constructed such that the supporting means 26 of the glass-plate working section 4 is omitted, and the glass plate 2 carried out from the bend-breaking work section 9 by the transporting means 6 is carried directly into the grinding work section 11.

The cutting work section 8 includes a cutting means 14 for forming main cut lines 12 and edge cut lines 13 on the glass plate 2 as well as a supporting means 27 for supporting the glass plate 2. The supporting means 27 has a pair of supporting devices 15 and 15a opposing each other in such a manner as to sandwich the transporting means 6 in a Y direction which is perpendicular to the X direction and parallel to the upper surface 3 and the lower surface 5 of the glass plate 2.

The cutting means 14 includes a cutter head 16, an X-direction moving device 17 for moving the cutter head 16 in the X direction, a Y-direction moving device 18 for moving the cutter head 16 in the Y direction, and a rotating means 19 for rotating the cutter head 16 about a rotational axis A extending in a Z direction which is perpendicular to the X and Y directions.

Figure 1:
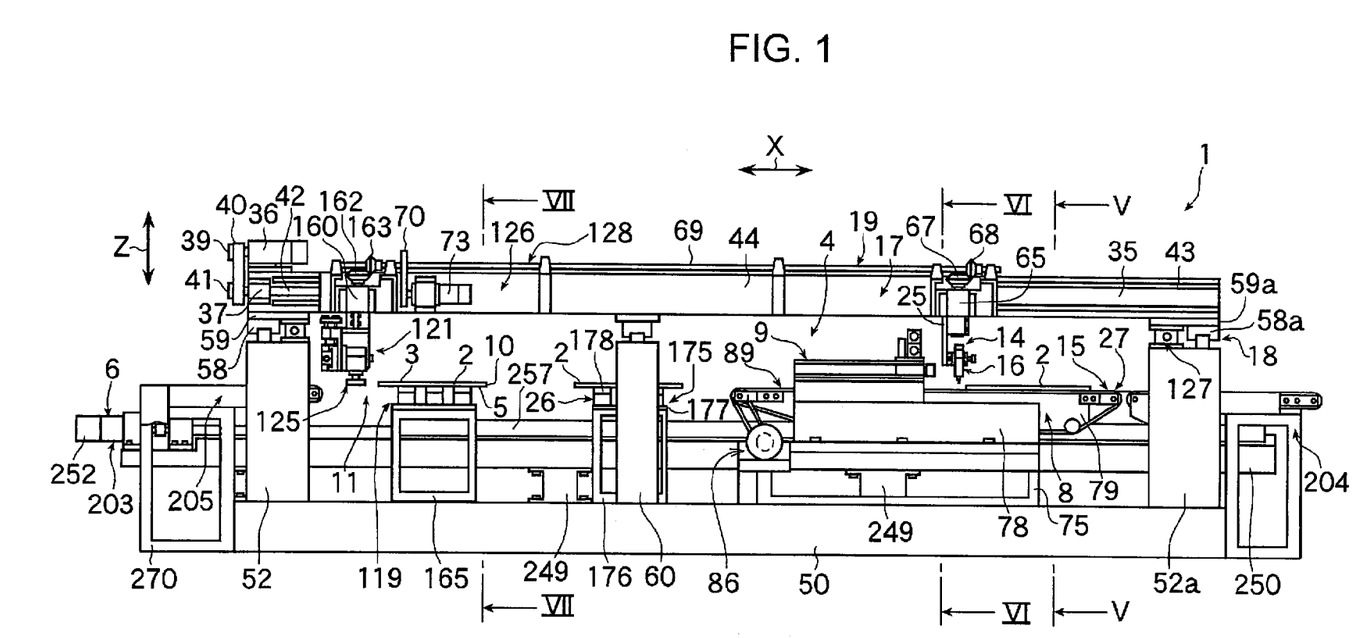
FIG. 1 is a front elevational view of an embodiment of an apparatus for working a glass plate in accordance with the present invention.
Figure 2:
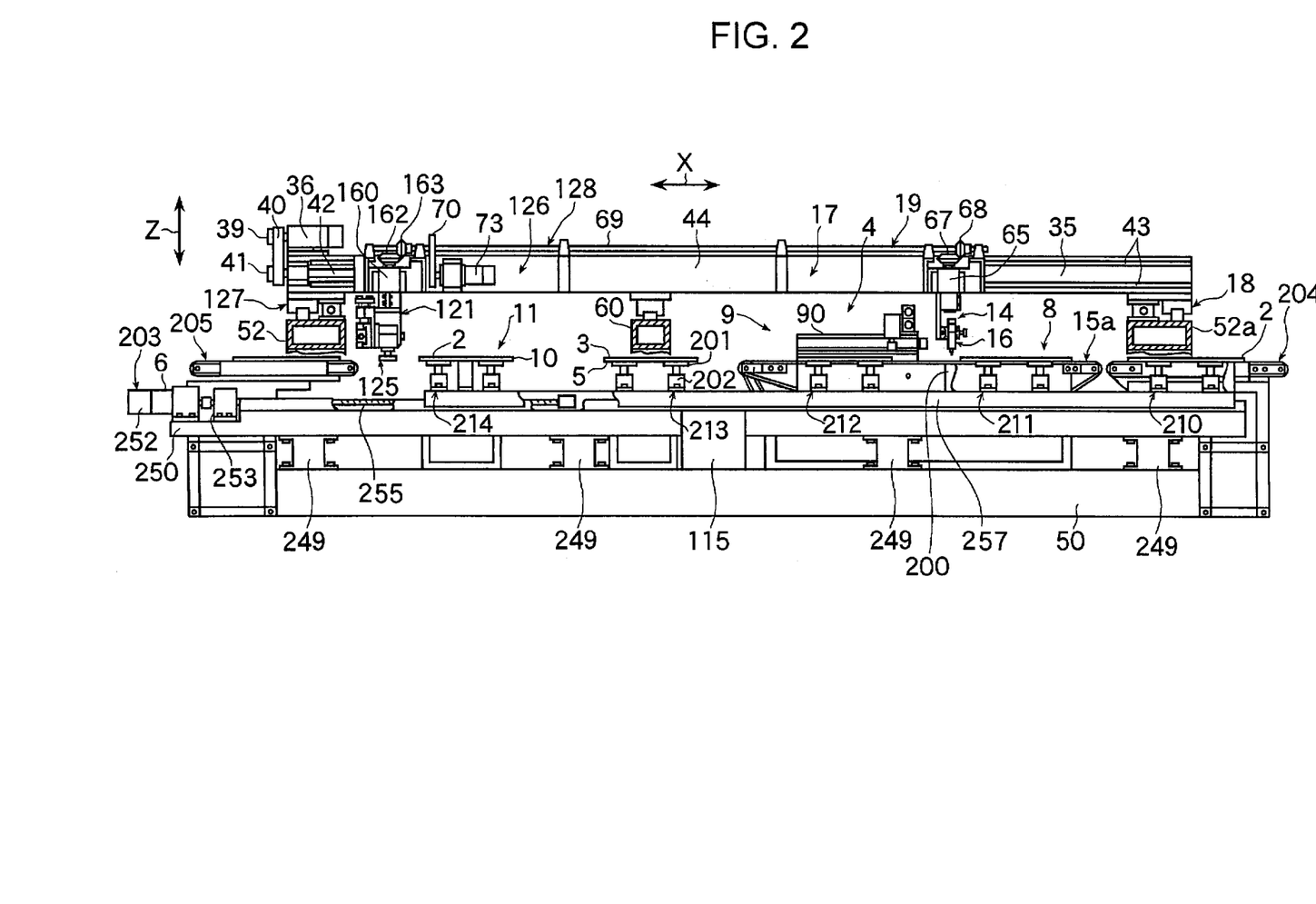
FIG. 2 is a partially cutaway front elevational view of the embodiment shown in FIG. 1.
Figure 3:
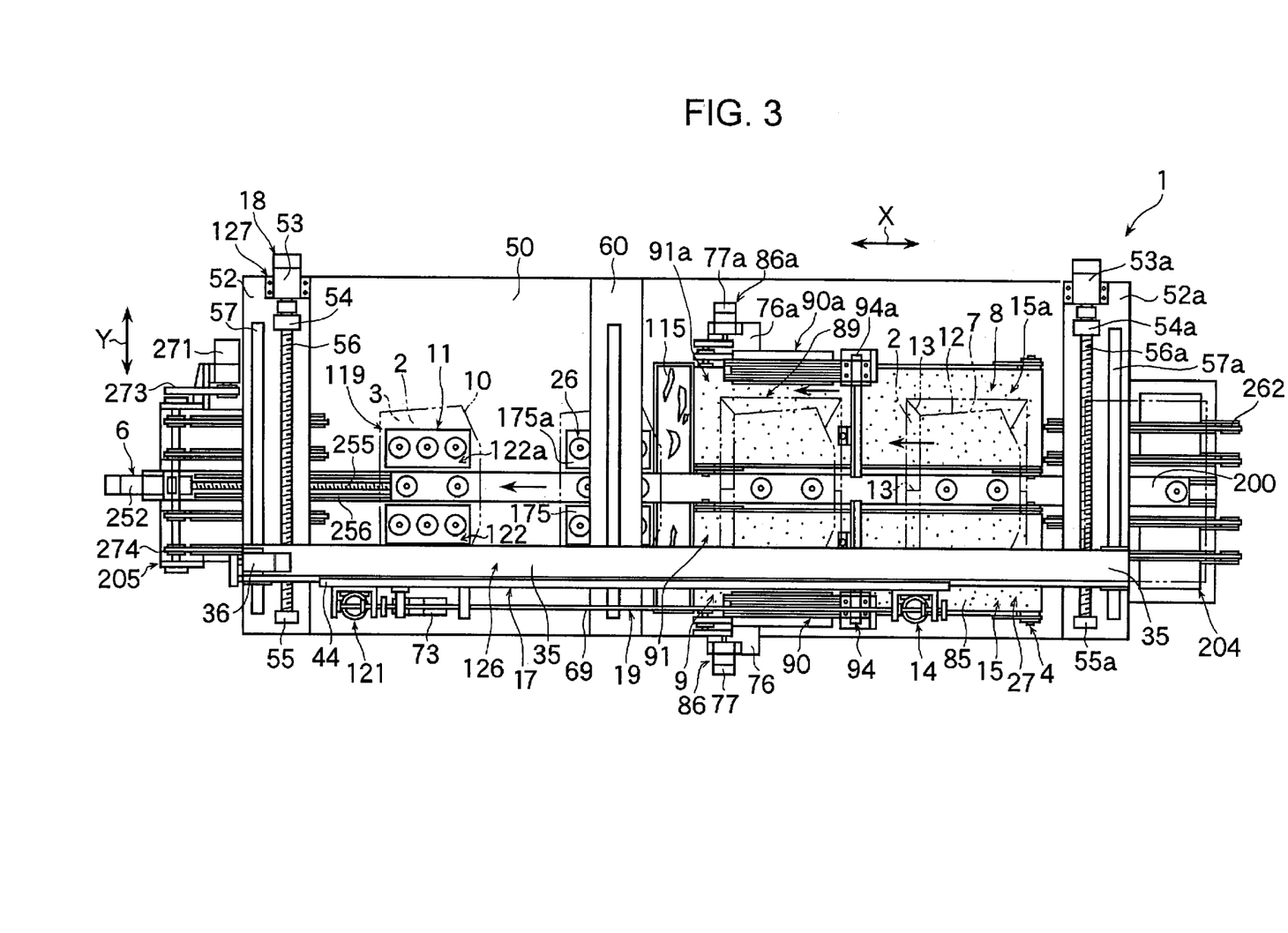
FIG. 3 is a plan view of the embodiment shown in FIG. 1.
Figure 4:
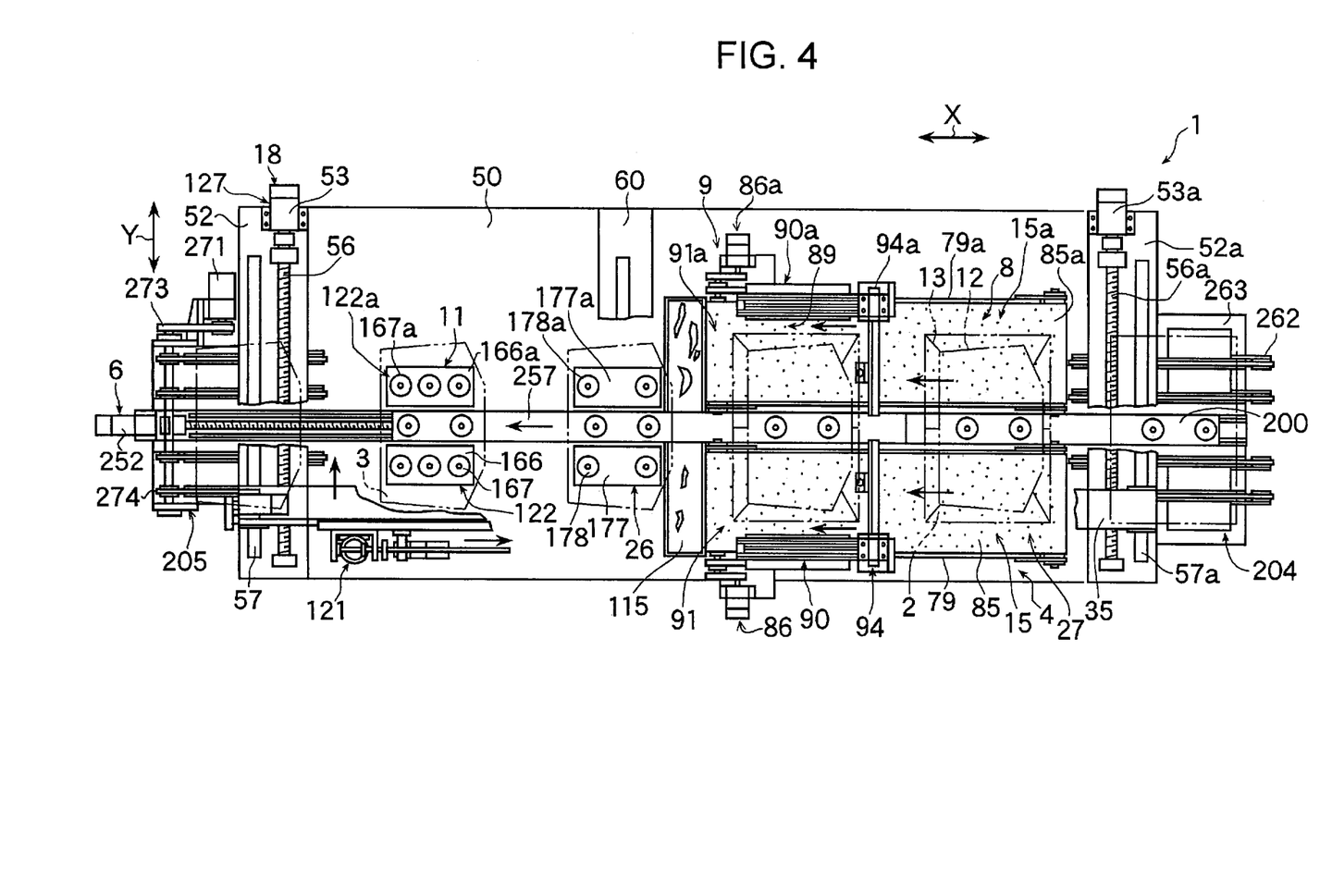
FIG. 4 is a partially cutaway plan view of the embodiment shown in FIG. 1.
Figure 5:
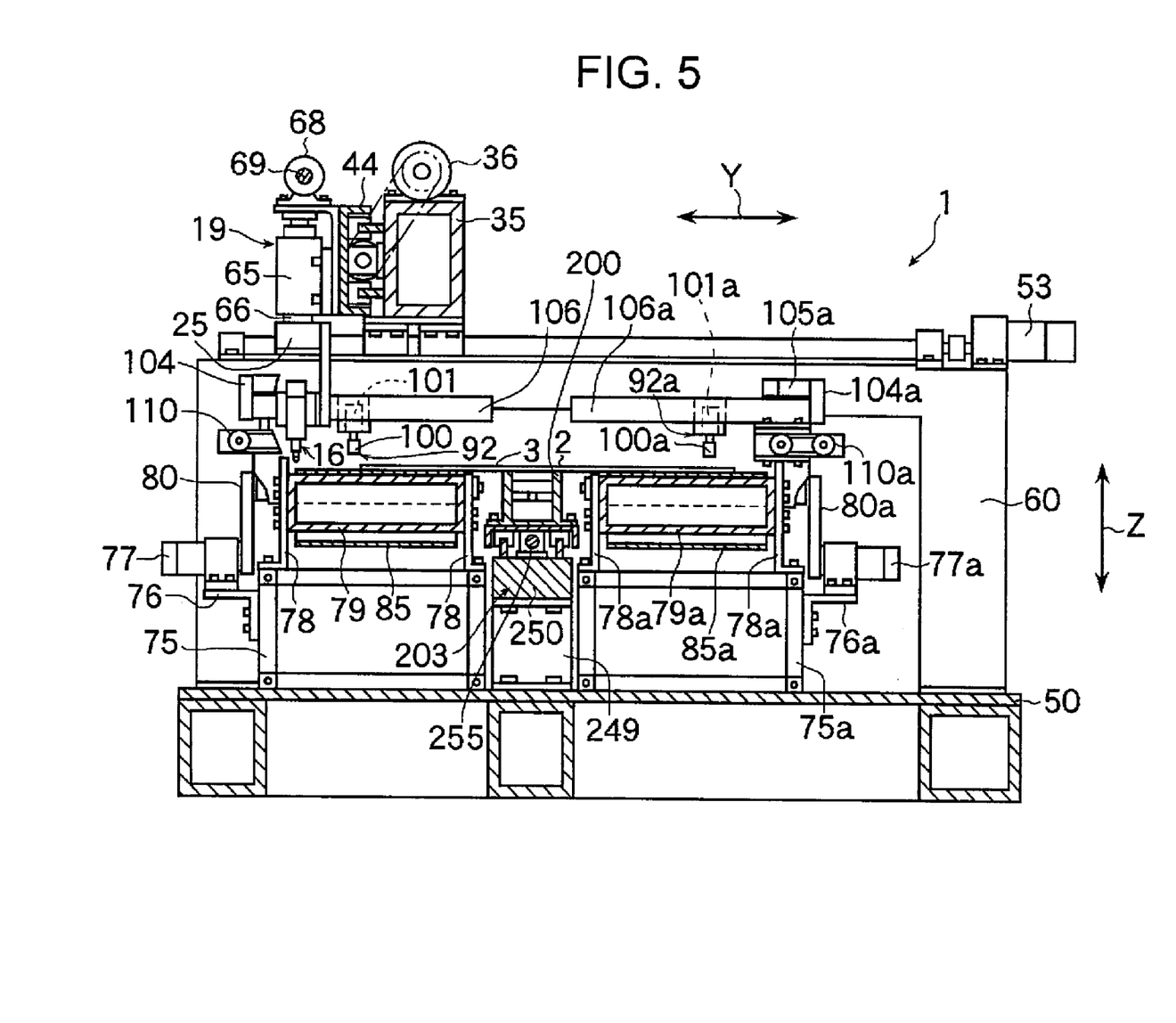
FIG. 5 is a cross-sectional view, taken along line V—V, of the embodiment shown in FIG. 1.
Figure 6:
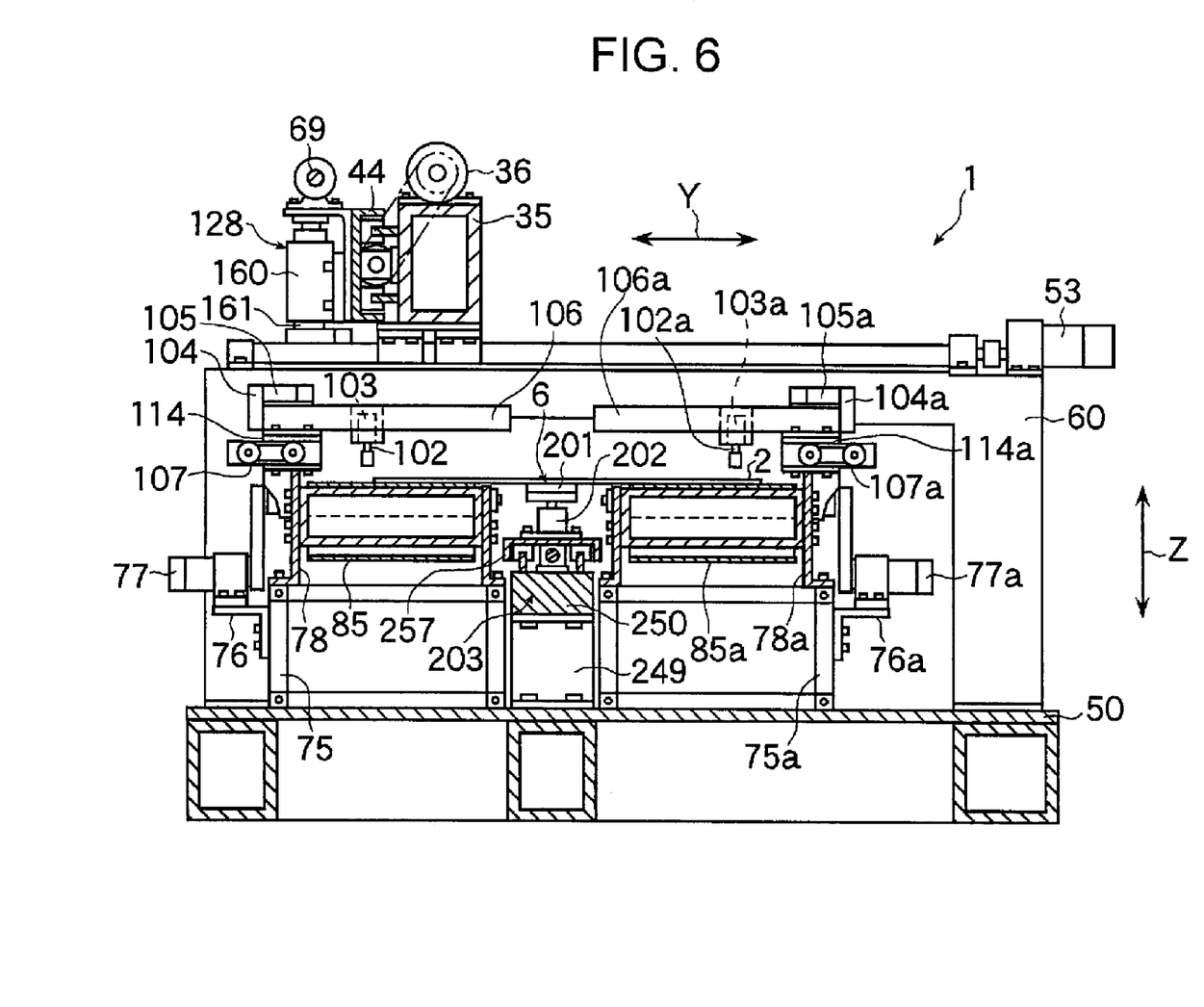
FIG. 6 is a cross-sectional view, taken along line VI—VI, of the embodiment shown in FIG. 1.
Figure 7:
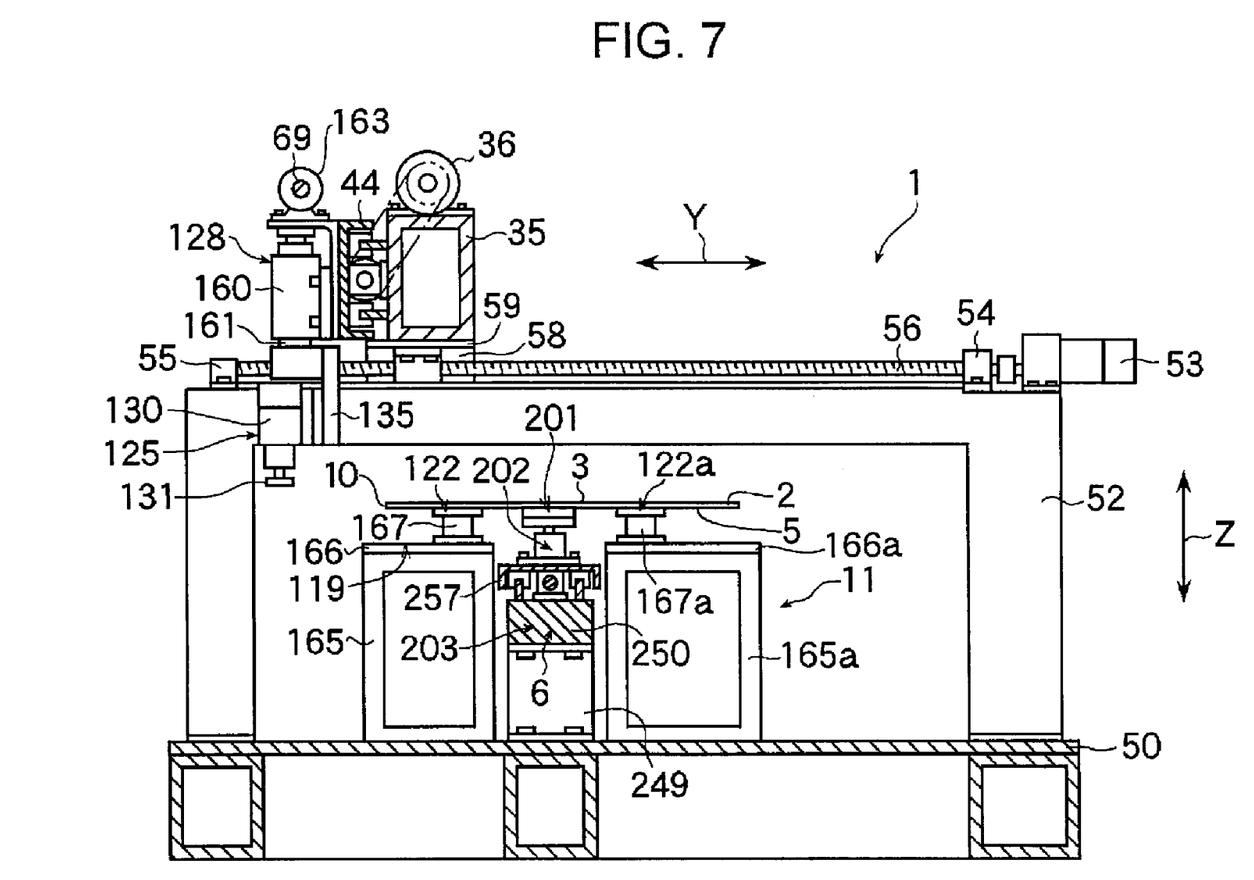
FIG. 7 is a cross-sectional view, taken along line VII—VII, of the embodiment shown in FIG. 1.
Figure 8:
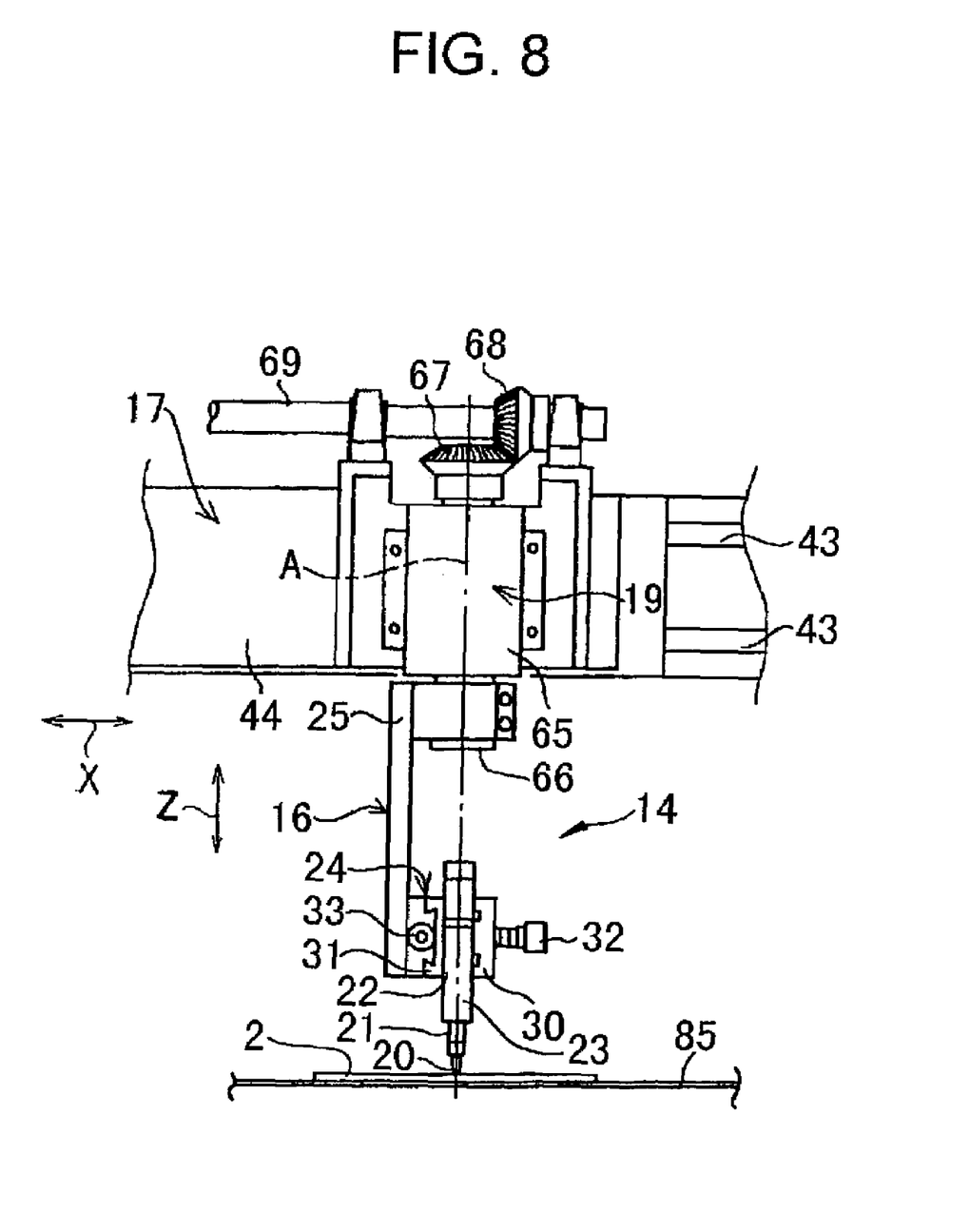
FIG. 8 is an enlarged explanatory view of mainly a cutter head of the embodiment shown in FIG. 1.

The cutter head 16 includes a cutter wheel 20; an air cylinder unit 23 made up of a piston rod 21 with the cutter wheel 20 attached thereto and a cylinder 22 so as to raise or lower the cutter wheel 20; a fine positioning mechanism 24 for finely adjusting the position of the cutter wheel 20 by finely adjusting the position of the cylinder 22; and a gripper 25 attached to a lower end of a shaft 66 which will be described later.

The air cylinder unit 23 raises or lowers the cutter wheel 20 by moving the piston rod 21 in the Z direction, and is adapted to apply a cutting force to the glass plate 2 by lowering the cutter wheel 20 at the time of forming the main cut lines 12 and the edge cut lines 13.

The fine positioning mechanism 24 is made up of an X-direction slide 30 and a Y-direction slide 31. The X-direction slide 30 is fitted to the gripper 25 so as to be movable in the X direction, while the Y-direction slide 31 is fitted to the X-direction slide 30 so as to be movable in the Y direction, the cylinder 22 being fixed to the Y-direction slide 31. The X-direction slide 30 is movable in the X direction for adjustment relative to the gripper 25 by turning an adjustment screw 32. The Y-direction slide 31 is movable in the Y direction for adjustment relative to the X-direction slide 30 by turning an adjustment screw 33.

As the X-direction slide 30 and the Y-direction slide 31 are moved for adjustment by turning the respective adjustment screws 32 and 33, the fine positioning mechanism 24 is capable of adjusting the position of the cutter wheel 20 to the rotational axis A about which the cutter head 16 rotates and of offsetting the position of the cutter wheel 20 from the position of the rotational axis A. As a result, the fine adjustment of the cutting path becomes possible. In other words, the cutting path can be enlarged or reduced. In the case where the main cut line 12 or the edge cut line 13 is formed on the glass plate 2, the position of the cutter wheel 20 is moved for adjustment so that the cutter wheel 20 passes through the rotational axis A.

The X-direction moving device 17 includes an upper frame 35 which is mounted on a base 50 through a frame 52 at one end, as viewed in the X direction, of the base 50, a frame 52a at the other end, as viewed in the X direction, of the base 50, and a frame 60 located between the frames 52 and 52a, and which extends in the X direction; an electric motor 36 mounted on the upper frame 35; a screw shaft 42 which is rotatably supported at its both ends on the upper frame 35 by means of a bearing 37 and has one end coupled to an output rotating shaft of the electric motor 36 by means of a pulley 39, a belt 40 and a pulley 41 and which extends in the X direction; a pair of parallel rails 43 mounted on the upper frame 35 and extending in the X direction; and a slider 44 which is fitted to the rails 43 so as to be movable in the X direction and to which a nut (not shown) threadedly engaged with the screw shaft 42 is secured. The shaft 66 is rotatably attached to the slider 44 by means of a bearing 65 which will be described later. As the electric motor 36 is operated, the rotation of its output rotating shaft rotates the screw shaft 42 by means of the pulley 39, the belt 40, and the pulley 41, and the rotation of the screw shaft 42 moves in the X direction the slider 44 to which the nut threadedly engaged with the screw shaft 42 is secured. As a result, the cutter head 16, which is attached to the shaft 66 supported rotatably on the slider 44, is moved in the X direction.

The Y-direction moving device 18 includes an electric motor 53 mounted on the frame 52; a screw shaft 56 which is coupled to an output rotating shaft of the electric motor 53 and is rotatably supported at its both ends on the frame 52 by means of bearings 54 and 55 in such a manner as to extend in the Y direction; a rail 57 mounted on the frame 52 and extending in the Y direction; a slider 58 which is fitted to the rail 57 and is movable in the Y direction; a nut (not shown) threadedly engaged with the screw shaft 56; a movable base 59 to which this nut and the slider 58 are secured and which is movable in the Y direction; an electric motor 53a mounted on the frame 52a; a screw shaft 56a which is coupled to an output rotating shaft of the electric motor 53a and is rotatably supported at its both ends on the frame 52a by means of bearings 54a and 55a in such a manner as to extend in the Y direction; a rail 57a mounted on the frame 52a and extending in the Y direction; a slider 58a which is fitted to the rail 57a and is movable in the Y direction; a nut (not shown) threadedly engaged with the screw shaft 56a; and a movable base 59a to which this nut and the slider 58a are secured and which is movable in the Y direction. The movable base 59 is provided at one end of the upper frame 35, while the movable base 59a is provided at the other end of the upper frame 35. Namely, the movable bases 59 and 59a are bridged by the upper frame 35. Through the synchronous operation of the electric motors 53 and 53a, the rotation of their output rotating shafts rotates the screw shafts 56 and 56a, and the rotation of the screw shafts 56 and 56a synchronously move in the Y direction the movable bases 59 and 59a to which the respective nuts and the sliders 58 and 58a are secured. Hence, the cutter head 16 is moved in the Y direction by means of the upper frame 35 mounted on the movable bases 59 and 59a.

The rotating means 19 includes the bearing 65 secured to the slider 44 of the X-direction moving device 17; the shaft 66 held by the bearing 65 and extending in the Z direction; a bevel gear 67 attached to an upper end of the shaft 66; a bevel gear 68 meshing with the bevel gear 67; a line shaft 69 to which the bevel gear 68 is attached and which is rotatably supported by the slider 44 in such a manner as to extend in the X direction; and an electric motor 73 coupled to the line shaft 69 by means of a pulley, a belt, and the like 70 and secured to the slider 44. Since the gripper 25 of the cutter head 16 is attached to a lower end of the shaft 66, the cutter head 16 is held in a suspended manner. Through the operation of the electric motor 73, the rotation of its output rotating shaft rotates the line shaft 69 by means of the pulley, the belt, and the like 70, and the rotation of the line shaft 69 rotates the shaft 66 about the rotational axis A by means of the bevel gears 67 and 68. Consequently, the cutter head 16 attached to the shaft 66 is rotated about the rotational axis A.

The supporting devices 15 and 15a in this embodiment are formed in a mutually similar manner, and the supporting device 15 supports a half area of the glass plate 2, while the supporting device 15a similarly supports the remaining half area of the glass plate 2. Accordingly, a description will be given hereafter of the supporting device 15, and as for the supporting device 15a, a reference character 'a' will be added to the reference numerals of its component parts, as required, and a description thereof will be omitted.

Figure 9:
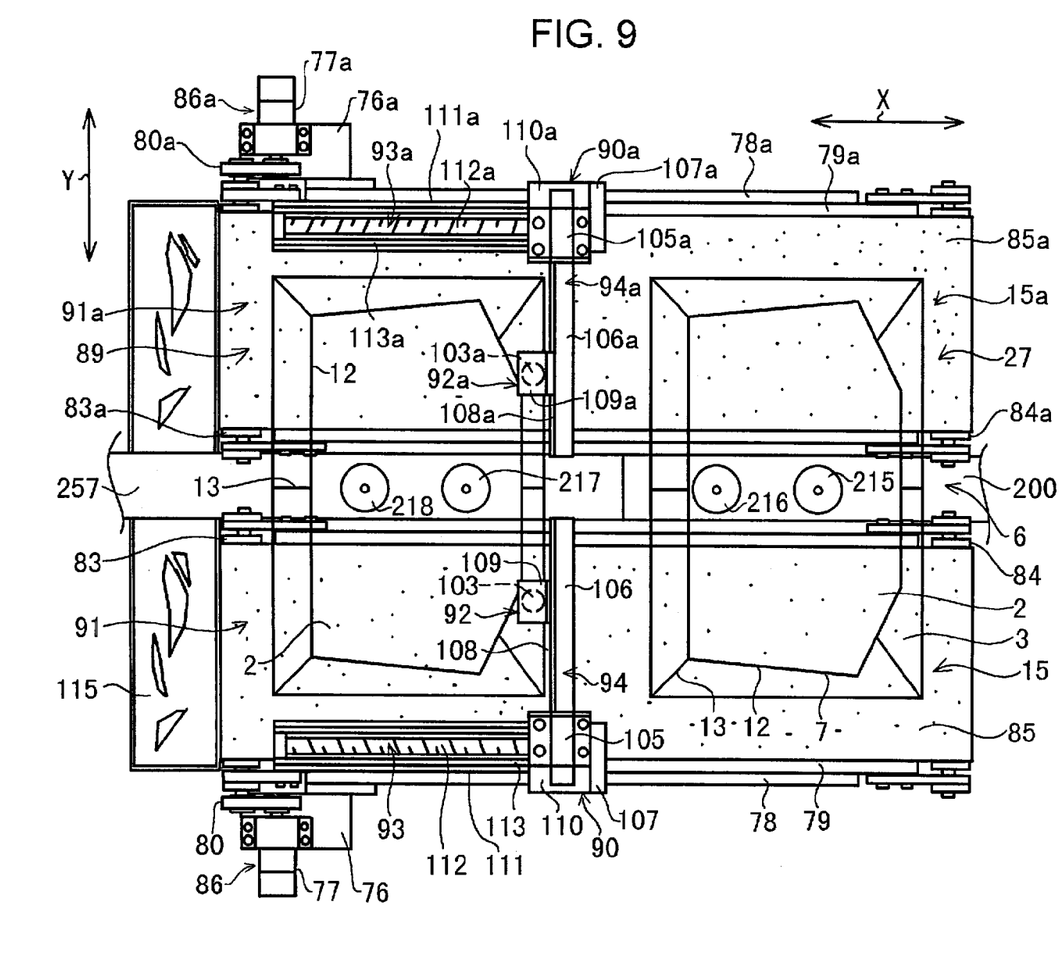
FIG. 9 is an enlarged explanatory view of mainly supporting means of a cutting work section and a bend-breaking work section of the embodiment shown in FIG. 1.

The supporting device 15 includes a supporting plate 79 supported on the base 50 by means of brackets 75 and columns 78; a drum 83 which is rotatably attached to one end, as viewed in the X direction, of the supporting plate 79; a drum 84 which is rotatably attached to the other end, as viewed in the X direction, of the supporting plate 79; and a flexible endless belt 85 wound around and trained between the drums 83 and 84. The glass plate 2 is arranged to be placed on the endless belt 85.

The bend-breaking work section 9 includes bend-breaking means 90 and 90a for bend-breaking along the main cut lines 12 the glass plate 2 on which the main cut lines 12 and the edge cut lines 13 have been formed in the cutting work section 8, as well as a supporting means 89 for supporting the glass plate 2. The supporting means 89 has a pair of supporting devices 91 and 91a opposing each other with the transporting means 6 placed therebetween in the Y direction.

The bend-breaking means 90 and 90a in this embodiment are formed in a mutually similar manner, while the supporting devices 91 and 91a are also formed in a mutually similar manner. The bend-breaking means 90 executes bend-breaking in a half area of the glass plate 2, while the bend-breaking means 90a likewise executes bend-breaking in a remaining half area of the glass plate 2. The supporting device 91 supports a half area of the glass plate 2, while the supporting device 91a likewise supports the remaining half area of the glass plate 2. Accordingly, a description will be given hereafter of the bend-breaking means 90 and the supporting device 91, and as for the bend-breaking means 90a and the supporting device 91a, a reference character 'a' will be added to the reference numerals of their component parts, as required, and a description thereof will be omitted.

The bend-breaking means 90 includes a bend-breaking head 92, an X-direction moving mechanism 93 for moving the bend-breaking head 92 in the X direction, and a Y-direction moving mechanism 94 for moving the bend-breaking head 92 in the Y direction.

The bend-breaking head 92 has a push rod 100 and an air cylinder unit 101 for raising or lowering the push rod 100. The air cylinder unit 101 is constituted by a piston rod 102, which has one end to which the push rod 100 is attached, and a cylinder 103 which is attached to a slider 109 which will be described later. The bend-breaking head 92 is arranged such that as the air cylinder unit 101 is operated, the push rod 100 is lowered so as to cause the glass plate 2 supported by the supporting means 89 to be pressed and bend-broken from its upper surface 3 by the push rod 100.

The Y-direction moving mechanism 94 includes an electric motor 105 fixed to a frame 106 extending in the Y direction; a screw shaft (not shown) connected to an output rotating shaft of the electric motor 105 at an end thereof and supported rotatably by the frame 106 and extending in the Y direction; a pair of parallel rails 108 mounted on the frame 106 and extending in the Y direction; and the slider 109 fitted to the pair of rails 108 so as to be movable in the Y direction. A nut (not shown) which is threadedly engaged with the screw shaft is secured to the slider 109, and the cylinder 103 is mounted on the slider 109. As the electric motor 105 is operated, the screw shaft having one end coupled to the output rotating shaft of the electric motor 105 rotates, and the slider 109, to which the nut threadedly engaged with the screw shaft is secured, moves in the Y direction, thereby causing the bend-breaking head 92 mounted on the slider 109 to move in the Y direction.

The X-direction moving mechanism 93 includes an electric motor 110 fixed to a frame 111 extending in the X direction; a screw shaft 112 connected to an output rotating shaft of the electric motor 110 by means of a pulley, a belt, and the like 107 and supported rotatably by the frame 111 and extending in the X direction; a nut (not shown) which is threadedly engaged with the screw shaft 112; a pair of parallel rails 113 mounted on the frame 111 and extending in the X direction; and a slider 114 fitted to the pair of rails 113 so as to be movable in the X direction. The frame 111 is fixed to the column 78, the nut which is threadedly engaged with the screw shaft 112 is secured to the slider 114, and the frame 106 is mounted on the slider 114. As the electric motor 110 is operated, the screw shaft 112 having one end coupled to the output rotating shaft of the electric motor 110 rotates, and the slider 114, to which the nut threadedly engaged with the screw shaft 112 is secured, moves in the X direction, thereby causing the frame 106 mounted on the slider 114 to move in the X direction. Thus, the bend-breaking head 92 moves in the X direction by means of the frame 106.

The supporting device 91 shares the supporting plate 79, the drum 83, the drum 84, and the endless belt 85 of the supporting device 15 of the cutting work section 8, and the supporting device 91 has a traveling means 86 for causing the endless belt 85 to travel in the X direction. The traveling means 86 has an electric motor 77 mounted on the base 50 by means of brackets 75 and 76, and an output rotating shaft of the electric motor 77 is coupled to the drum 83 by means of a pulley, a belt, and the like 80. A cullet accommodating section 115 for accommodating the cullet (not shown) of the glass plate 2 bent-broken on the endless belt 85 is provided at a downstream end of the endless belt 85. The supporting device 91 is arranged such that, in order to accommodate in the cullet accommodating section 115 the cullet (not shown) of the glass plate 2 bent-broken on the endless belt 85 by the bend-breaking means 90, the drum 83 having one end coupled to the output rotating shaft of the electric motor 77 by means of the pulley, the belt, and the like 80 is rotated by the operation of the electric motor 77, the rotation of this drum 83 causes the endless belt 85 to travel in the X direction, and the traveling of the endless belt 85 moves the cullet to the downstream end of the endless belt 85, thereby accommodating the cullet in the cullet accommodating section 115.

It should be noted that although the supporting devices 15 and 91 are constructed so as to share the supporting plate 79, the drum 83, the drum 84, and the endless belt 85, in a case where the supporting devices 15 and 91 are constructed without sharing them, the supporting device 91, for example, may include the supporting plate 79, the drum 83, the drum 84, the endless belt 85, and the aforementioned traveling means 86, whereas the supporting means 15 may include tables (not shown) disposed on the base 50 by means of brackets in such a manner as to oppose each other in the Y direction as well as vacuum suction units (not shown) for sucking under a vacuum the glass plates 2, respectively set on the tables so as to hold it. These vacuum suction units may be respectively connected to a vacuum suction pump (not shown) through the piping and valves, and may be adapted to suck the glass plate 2 under a vacuum by the operation of the vacuum suction pump.

The supporting means 26 has a pair of supporting tables 175 and 175a opposing each other with the transporting means 6 placed therebetween in the Y direction.

The supporting tables 175 and 175a in this embodiment are formed in a mutually similar manner, and the supporting table 175 supports a half area of the glass plate 2, while the supporting table 175a supports the remaining half area of the glass plate 2. Accordingly, a description will be given hereafter of the supporting table 175, and as for the supporting table 175a, a reference character 'a' will be added to the reference numerals of its component parts, as required, and a description thereof will be omitted.

The supporting table 175 includes a table 177 disposed on the base 50 by means of a bracket 176 and a plurality of vacuum suction units 178 for vacuum-sucking the glass plate 2 set on the table 177 so as to hold it. The plurality of vacuum suction units 178 are respectively connected to a vacuum suction pump (not shown) through the piping and valves, and are adapted to suck the glass plate 2 under a vacuum by the operation of the vacuum suction pump.

The grinding work section 11 includes a grinding means 121 for grinding the peripheral edges 10 of the glass plate 2 bend-broken in the bend-breaking work section 9 as well as a supporting means 119 for supporting the glass plate 2. The supporting means 119 has a pair of supporting devices 122 and 122a opposing each other with the transporting means 6 placed therebetween.

The grinding means 121 includes a grinding head 125, an X-direction moving device 126 for moving the grinding head 125 in the X direction, a Y-direction moving device 127 for moving the grinding head 125 in the Y direction, and a rotating means 128 for rotating the grinding head 125 about a rotational axis B extending in the Z direction.

Figure 10:
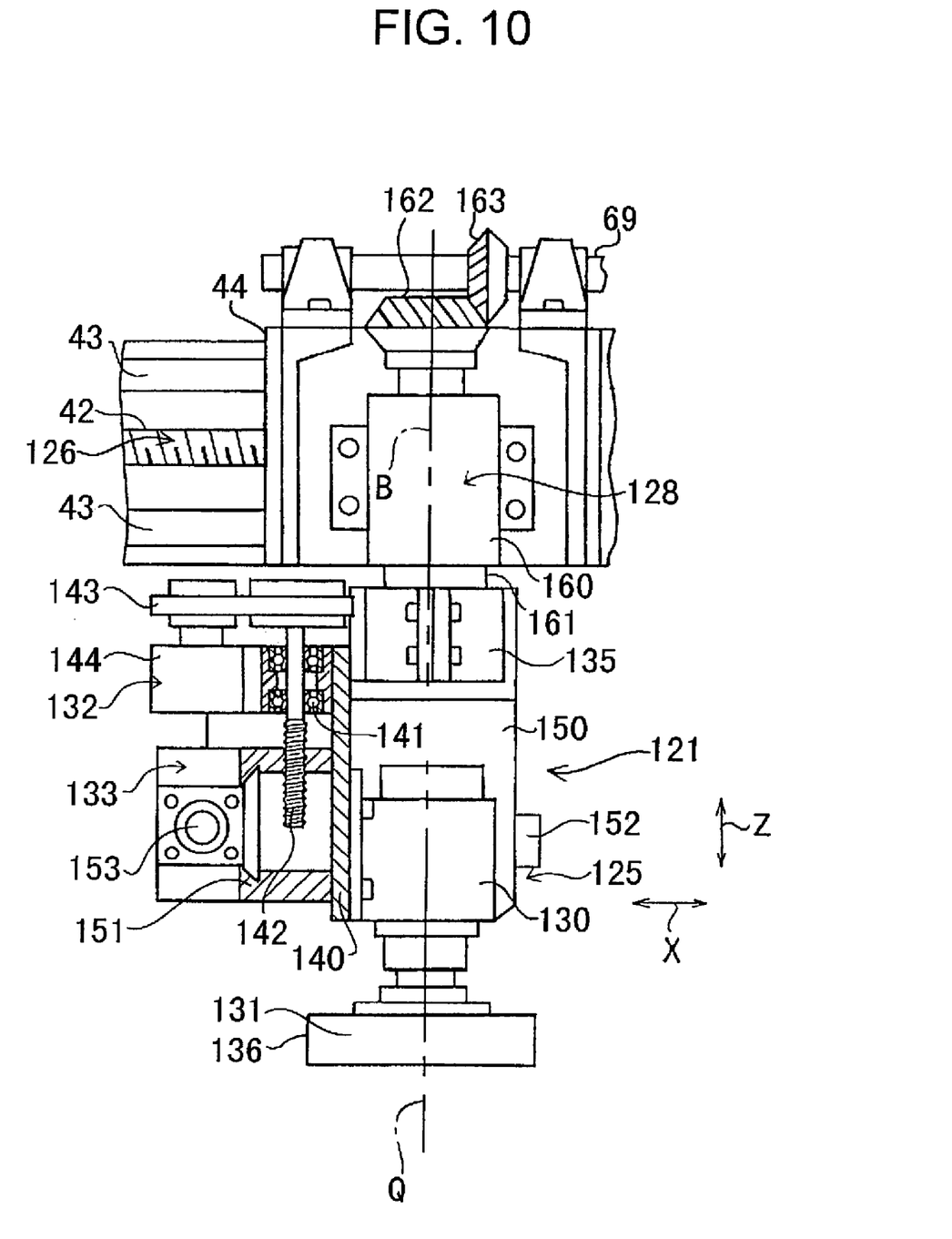
FIG. 10 is an enlarged explanatory view of mainly a grinding head of the embodiment shown in FIG. 1.

The grinding head 125 includes an electric motor 130; a grinding wheel 131 attached to one end of an output rotating shaft of the electric motor 130 so as to rotate by using the output rotating shaft as a rotational axis Q extending in the Z direction; a vertically moving means 132 for vertically moving the grinding wheel 131; a fine positioning mechanism 133 for finely adjusting the position of the grinding wheel 131 by finely adjusting the position of the electric motor 130; and a gripper 135 attached to a lower end of a shaft 161 which will be described later.

The grinding wheel 131 is arranged to grind the peripheral edges 10 of the glass plate 2 by its outer peripheral surface 136.

The vertically moving means 132 includes a Z-direction slide 140 on which the electric motor 130 is disposed in such a manner that the output rotating shaft of the electric motor 130 extends in the Z direction; a screw shaft 142 supported rotatably by the Z-direction slide 140 by means of a bearing 141 in such a manner as to extend in the Z direction; and an electric motor 144 coupled to the screw shaft 142 by means of a pulley, a belt, and the like 143. The Z-direction slide 140 is fitted to a Y-direction slide 151, which will be described later, so as to be movable in the Z direction, and the screw shaft 142 is threadedly engaged with the Y-direction slide 151. The vertically moving means 132 is so arranged that as the electric motor 130 is operated, the screw shaft 142 is rotated by means of the pulley, the belt, and the like 143, and this rotation moves the grinding wheel 131 in the Z direction by means of the Z-direction slide 140 and the electric motor 130 with respect to the Y-direction slide 151 threadedly engaged with the screw shaft 142.

The fine positioning mechanism 133 is made up of an X-direction slide 150 and the Y-direction slide 151. The X-direction slide 150 is fitted to the gripper 135 so as to be movable in the X direction, while the Y-direction slide 151 is fitted to the X-direction slide 150 so as to be movable in the Y direction and is fitted to the Z-direction slide 140 so as to be movable in the Z direction. The X-direction slide 150 is movable in the X direction for adjustment relative to the gripper 135 by turning an adjustment screw 152. The Y-direction slide 151 is movable in the Y direction for adjustment relative to the X-direction slide 150 by turning an adjustment screw 153.

As the X-direction slide 150 and the Y-direction slide 151 are moved for adjustment by turning the respective adjustment screws 152 and 153, the fine positioning mechanism 133 is capable of adjusting a grinding point (not shown) at which the outer peripheral surface 136 of the grinding wheel 131 grinds the peripheral edges 10 of the glass plate 2 to the rotational axis B about which the grinding head 125 rotates, and of offsetting the grinding point from the rotational axis B. As a result, the fine adjustment of the path of movement becomes possible. In other words, the path of movement can be enlarged or reduced. In the case where the peripheral edges 10 of the glass plate 2 is ground, the grinding wheel 131 is moved for adjustment so that the grinding point passes through the rotational axis B.

The X-direction moving device 126 shares the electric motor 36, the screw shaft 42, and the slider 44 of the X-direction moving device 17, and the shaft 161 is rotatably attached to the slider 44 by means of a bearing 160 which will be described later. As the electric motor 36 is operated, the rotation of its output rotating shaft rotates the screw shaft 42 by means of the pulley 39, the belt 40, and the pulley 41, and the rotation of the screw shaft 42 moves the slider 44, to which the nut threadedly engaged with the screw shaft 42 is secured, in the X direction. As a result, the grinding head 125 attached to the shaft 161 rotatably supported by the slider 44 is moved in the X direction.

The Y-direction moving device 127 shares the electric motors 53 and 53a, the screw shafts 56 and 56a, the sliders 58 and 58a, and the movable bases 59 and 59a of the Y-direction moving device 18. As the electric motors 53 and 53a are synchronously operated, the rotation of their output rotating shafts rotates the screw shafts 56 and 56a. The rotation of the screw shafts 56 and 56a, in turn, synchronously moves the movable bases 59 and 59a, to which the nuts and the sliders 58 and 58a are respectively secured, in the Y direction, thereby moving the grinding head 125 in the Y direction by means of the upper frame 35 mounted on the movable bases 59 and 59a.

The rotating means 128 shares the line shaft 69 and the electric motor 73 of the rotating means 19, and further includes the bearing 160 fixed to the slider 44 of the X-direction moving device 126, the shaft 161 held by the bearing 160 and extending in the Z direction, a bevel gear 162 attached to an upper end of the shaft 161, and a bevel gear 163 meshing with the bevel gear 162. The bevel gear 163 is attached to the line shaft 69. Since the gripper 135 of the grinding head 125 is attached to a lower end of the shaft 161, the grinding head 125 is held in a suspended manner. As the electric motor 73 is operated, the rotation of its output rotating shaft rotates the line shaft 69 by means of the pulley, the belt, and the like 70, and the rotation of the line shaft 69 rotates the shaft 161 about the rotational axis B by means of the bevel gears 162 and 163. As a result, the grinding head 125 attached to the shaft 161 is rotated about the rotational axis B.

The supporting devices 122 and 122a in this embodiment are formed in a mutually similar manner, and the supporting device 122 supports a half area of the glass plate 2, while the supporting device 122a similarly supports the remaining half area of the glass plate 2. Accordingly, a description will be given hereafter of the supporting device 122, and as for the supporting device 122a, a reference character 'a' will be added to the reference numerals of its component parts, as required, and a description thereof will be omitted.

The supporting device 122 includes a table 166 disposed on the base 50 by means of a bracket 165 and a plurality of vacuum suction units 167 for vacuum-sucking the glass plate 2 set on the table 166 so as to hold it. The plurality of vacuum suction units 167 are respectively connected to a vacuum suction pump (not shown) through the piping and valves, and are adapted to suck the glass plate 2 under a vacuum by the operation of the vacuum suction pump.

It should be noted that the supporting means 26, 27, 89, and 119 are arranged in series in the X direction, and the same intervals are respectively provided between the cutting work area of the supporting means 27 and the bend-breaking work area of the supporting means 89 in the X direction, between the bend-breaking work area of the supporting means 89 and the supporting means 26 in the X direction, and between the supporting means 26 and the supporting means 119 in the X direction.

Figure 11:
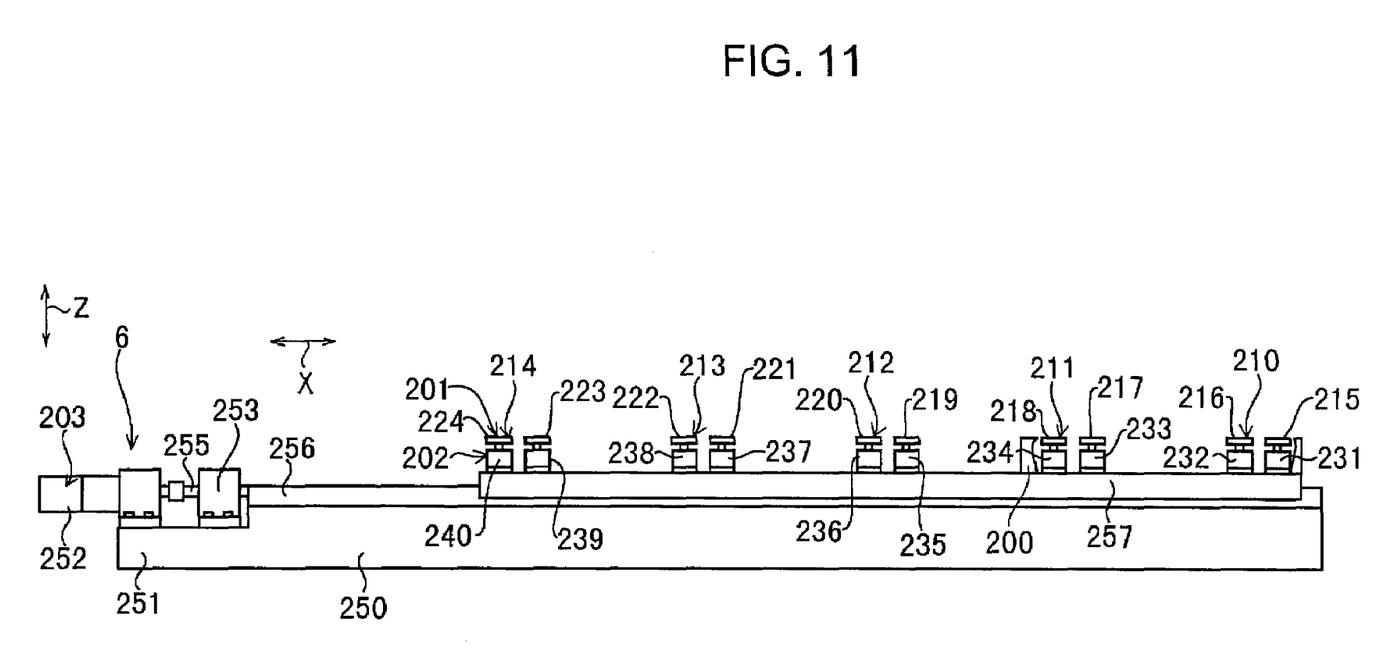
FIG. 11 is an explanatory diagram of a transporting means of the embodiment shown in FIG. 1.

The transporting means 6 includes a holding means 201 for holding the glass plate 2 from its lower surface 5, a vertically moving means 202 for raising or lowering the holding means 201, and a moving means 203 for moving the holding means 201 in the X direction by means of the vertically moving means 202. The transporting means 6 is adapted to carry into the cutting work section 8, the bend-breaking work section 9, and the grinding work section 11 the glass plate 2 to be worked, and to carry out the worked glass plate 2 from the cutting work section 8, the bend-breaking work section 9, and the grinding work section 11 in synchronism with the carrying in.

The transporting means 6 further includes a supporting table 200 for supporting the glass plate 2, which is placed on the endless belts 85 and 85a and is subject to cutting work, from its lower surface 5 in the areas of the endless belts 85 and 85a; a placing table 204 for placing thereon the glass plate 2 to be carried into the cutting work section 8; and a carrying-out device 205 for carrying out the glass plate 2, which has been carried out from the grinding work section 11, from the glass-plate working apparatus 1 of this embodiment.

The holding means 201 includes a vacuum suction means 210 for vacuum-sucking the lower surface 5 of the glass plate 2 placed on the placing table 204, so as to hold it; a vacuum suction means 211 for vacuum-sucking the lower surface 5 of the glass plate 2 placed on the endless belt 85 and subjected to cutting work by the cutting means 14, so as to hold it; a vacuum suction means 212 for vacuum-sucking the lower surface 5 of the glass plate 2 placed on the endless belt 85 and subjected to bend-breaking work by the bend-breaking means 90, so as to hold it; a vacuum suction means 213 for vacuum-sucking the lower surface 5 of the glass plate 2 placed on the supporting table 175, so as to hold it; and a vacuum suction means 214 for vacuum-sucking the lower surface 5 of the glass plate 2 subjected to grinding work by the grinding means 121 and supported by the supporting device 122, so as to hold it. The vacuum suction means 210 to 214 are arranged in series in the X direction and are disposed on the moving means 203 respectively at the same intervals by means of the vertically moving means 202.

The vacuum suction means 210 has vacuum suction units 215 and 216 arranged in the X direction; the vacuum suction means 211 has vacuum suction units 217 and 218 arranged in the X direction; the vacuum suction means 212 has vacuum suction units 219 and 220 arranged in the X direction; the vacuum suction means 213 has vacuum suction units 221 and 222 arranged in the X direction; and the vacuum suction means 214 has vacuum suction units 223 and 224 arranged in the X direction. The vacuum suction units 215 to 224 are respectively connected to a vacuum suction pump (not shown) through the piping and valves, and are adapted to suck the respective glass plate 2 under a vacuum by the operation of the vacuum suction pump.

The vertically moving means 202 has air cylinder units 231 to 240, and the vacuum suction units 215 to 224 are respectively attached to respective outer tips of their piston rods. Respective cylinders of the air cylinder units 231 to 240 are attached to a slider 257 which will be described later. As the air pressure of the air cylinder units 231 to 240 is boosted, their piston rods are respectively moved in the Z direction, which in turn causes the vacuum suction units 215 to 224, respectively attached to the outer tips of these piston rods to be raised. On the other hand, as the air pressure of the air cylinder units 231 to 240 is lowered, their piston rods are respectively moved in the Z direction, which in turn causes the vacuum suction units 215 to 224 attached to the outer tips of these piston rods to be lowered. It should be noted that the respective upper surfaces of the vacuum suction units 215 and 216 in the lowered state are flush with a plurality of endless belts 262 which support the glass plate 2 and will be described later; the respective upper surfaces of the vacuum suction units 217 to 220 in the lowered state are flush with the endless belt 85 supporting the glass plate 2; the respective upper surfaces of the vacuum suction units 221 and 222 in the lowered state are flush with upper surfaces of a plurality of vacuum suction units 178 of the supporting table 26; and the respective upper surfaces of the vacuum suction units 223 and 224 in the lowered state are flush with upper surfaces of the plurality of vacuum suction units 167 of the supporting device 122.

The moving means 203 has a frame 250 mounted on the base 50 by means of brackets 249 and extending in the X direction; an electric motor 252 mounted at one end side 251 of the frame 250; a screw shaft 255 supported rotatably on the frame 250 by means of bearings 253 at its both ends and extending in the X direction; a nut (not shown) threadedly engaged with the screw shaft 255; a pair of parallel rails 256 mounted on the frame 250 and extending in the X direction; and the slider 257 which is fitted to the pair of rails 256 in such a manner as to be movable in the X direction and extends in the X direction, and to which the nut is secured. The frame 250 is provided between the supporting devices 15 and 15a, between the supporting devices 91 and 91a, between the supporting tables 175 and 175a, and between the supporting devices 122 and 122a, and the respective cylinders of the air cylinder units 231 to 240 are attached to the slider 257. As the electric motor 252 is operated, the rotation of its output rotating shaft rotates the screw shaft 255, and this rotation causes the slider 257, to which the nut threadedly engaged with the screw shaft 255 is secured, to move in the X direction. Consequently, the vacuum suction units 215 to 224 are synchronously moved in the X direction by means of the air cylinder units 231 to 240 attached to the slider 257.

To allow the vacuum suction units 215 to 218 to be vertically moved by the air cylinder units 231 to 234, the supporting table 200 is mounted on the slider 257 in such a manner as to surround them. The upper surface of the supporting table 200 is flush with the upper surfaces of the vacuum suction units 217 and 218 in the lowered state.

The placing table 204 is disposed on the carrying-in side where the glass plate 2 is carried in, and rollers (not shown) for positioning the glass plate 2 and the plurality of endless belts 262 on which the glass plate 2 is placed are disposed on the upper surface of the placing table 204.

The carrying-out device 205 is disposed on the carrying-out side where the glass plate 2 is carried out, and includes an electric motor 271 supported by a frame 270; a driving-side drum (not shown) and a driven-side drum (not shown) which are rotatably supported by the frame 270; and a plurality of endless belts 274 stretched between these drums. An output rotating shaft (not shown) of the electric motor 271 is coupled to the driving-side drum by means of a pulley, a belt, and the like 273.

The glass-plate working apparatus 1 in accordance with this embodiment is further comprised of a controller (not shown) for controlling the respective operation. This controller is connected to the electric motors 36, 53, 53a, 73, 77, 77a, 105, 105a, 110, 110a, 130, 144, 252, and 271; the vacuum suction pumps of the vacuum suction units 167, 178, and 215 to 224; and the air cylinder units 23, 101, 101a, and 231 to 240. By controlling the rotation of these output rotating shafts, the vacuum suction force, and the air pressure, respectively, the controller controls the above-described operation and the operation which will be described later.

In addition, the control of the rotation of the output rotating shaft of the electric motor 130 may be effected by the controller, but the present invention is not limited to the same, and the output rotating shaft of the electric motor 130 may be constantly rotated at a fixed rotational speed.

In the case where the glass plate 2 having the upper surface 3 coated is worked by the glass-plate working apparatus 1 in accordance with this embodiment, the glass plate 2 to be worked is first placed on the plurality of endless belts 262 on the placing table 204. Next, this glass plate 2 is sucked under a vacuum from its lower surface 5 by the vacuum suction units 215 to 216 and is thereby held, and the glass plate 2 thus held is raised by the synchronous actuation of the air cylinder units 231 and 232. Further, as the electric motor 252 of the moving means 203 is operated, the slider 257 is moved in the X direction to move the glass plate 2 in the X direction, and the air cylinder units 231 and 232 are synchronously actuated to lower the glass plate 2, thereby placing the glass plate 2 in the cutting work area on the endless belts 85 and 85a. Then, while the cutter head 16 is being rotated about the rotational axis A by the rotating means 19 such that the blade of the cutter wheel 20 is constantly held in a tangential direction with respect to the main cut line 12, the cutter wheel 20 is lowered by the air cylinder unit 23 to apply a cutting pressure to the glass plate 2, and the cutter head 16 is moved in the X and Y directions by the X-direction moving device 17 and the Y-direction moving device 18 so as to form the predetermined main cut lines 12. Further, while the cutter head 16 is being rotated about the rotational axis A by the rotating means 19 such that the blade of the cutter wheel 20 is constantly held in a tangential direction with respect to the edge cut line 13, the cutter wheel 20 is lowered by the air cylinder unit 23 to apply a cutting pressure to the glass plate 2, and the cutter head 16 is moved in the X and Y directions by the synchronous operation of the X-direction moving device 17 and the Y-direction moving device 18 so as to form the predetermined edge cut lines 13. The cutting means 14 of the cutting work section 8 forms the edge cut lines 13 at least in the area of the glass plate 2 located between the supporting devices 15 and 15a. Next, the glass plate 2 on which the main cut lines 12 and the edge cut lines 13 have been formed is sucked under a vacuum from its lower surface 5 by the vacuum suction devices 217 and 218 and is thereby held, and the glass plate 2 thus held is raised by the synchronous actuation of the air cylinder units 233 and 234. Further, as the electric motor 252 of the moving means 203 is operated, the slider 257 is moved in the X direction to move this glass plate 2 in the X direction, and the air cylinder units 233 and 234 are synchronously actuated to lower the glass plate 2, thereby placing the glass plate 2 in the bend-breaking work area on the endless belts 85 and 85a. Then, as the push rod 100 is moved by the X-direction moving mechanism 93 and the Y-direction moving mechanism 94, and the push rod 100 is lowered by the air cylinder unit 101, the glass plate 2 is pressed from its upper surface 3 so as to be bend-broken along the main cut lines 5. Next, the bend-broken glass plate 2 is sucked under a vacuum from its lower surface 5 by the vacuum suction devices 219 and 220 and is thereby held, and the glass plate 2 thus held is raised by the synchronous actuation of the air cylinder units 235 and 236. Further, as the electric motor 252 of the moving means 203 is operated, the slider 257 is moved in the X direction to move the glass plate 2 in the X direction, and the air cylinder units 235 and 236 are synchronously actuated to lower the glass plate 2, thereby placing the glass plate 2 on the supporting tables 175 and 175a. While the bend-broken glass plate 2 is being raised by the air cylinder units 235 and 236 of the transporting means 6, in order to accommodate in the cullet accommodating section 115 the cullet of the glass plate 2 which has been bend-broken by the bend-breaking means 90, the electric motor 77 is operated to cause the endless belt 85 to travel in the X direction by means of the drums 83 and 84, thereby allowing the cullet on the endless belt 85 to move to the downstream end of the endless belt 85 and to be accommodated in the cullet accommodating section 115. Next, the glass plate 2 placed on the supporting tables 175 and 175a is sucked under a vacuum from its lower surface 5 by the vacuum suction devices 221 and 222 and is thereby held, and the glass plate 2 thus held is raised by the synchronous actuation of the air cylinder units 237 and 238. Further, as the electric motor 252 of the moving means 203 is operated, the slider 257 is moved in the X direction to move the glass plate 2 in the X direction, and the air cylinder units 237 and 238 are synchronously actuated to lower the glass plate 2, thereby placing the glass plate 2 on the supporting devices 122 and 122a. Next, as the electric motor 130 is operated, the grinding wheel 131 is rotated, and while the grinding head 125 is being rotated by the rotating means 128 such that the grinding wheel 131 is constantly held at a predetermined angle with respect to the peripheral edge 10 of the glass plate 2 at the grinding point, the grinding head 125 is moved in the X and Y directions by the X-direction moving device 126 and the Y-direction moving device 127, thereby grinding the peripheral edges 10 of the glass plate 2. Next, the glass plate 2 whose peripheral edges 10 have been ground is sucked under a vacuum from its lower surface 5 by the vacuum suction units 223 and 224 and is thereby held, and the glass plate 2 thus held is raised by the synchronous actuation of the air cylinder units 239 and 240. Further, as the electric motor 252 of the moving means 203 is operated, the slider 257 is moved in the X direction to move the glass plate 2 in the X direction, and the air cylinder units 239 and 240 are synchronously actuated to lower the glass plate 2, thereby placing the glass plate 2 on the plurality of endless belts 274 of the carrying-out device 205. Next, as the electric motor 271 is operated, the rotation of its output rotating shaft causes the plurality of endless belts 274 stretched between the driving-side drum and the driven-side drum to travel in the X direction by means of the pulley, the belt, and the like 274, thereby carrying out the worked glass plate 2 on the plurality of endless belts 274 from the glass-plate working apparatus 1 of this embodiment.

It should be noted that in a case where a plurality of glass plates 2 are worked by the glass-plate working apparatus 1 of this embodiment, the glass plates 2 are carried into the cutting work section 8, the bend-breaking work section 9, and the grinding work section 11, respectively, by the transporting means 6, the respective worked glass plates 2 are carried out from the cutting work section 8, the bend-breaking work section 9, and the grinding work section 11 in synchronism with the carrying-in, and cutting work, bend-breaking work, and grinding work are synchronously effected with respect to the respective glass plates 2 carried in.

In accordance with the present invention, it is possible to provide a method of and an apparatus for working a glass plate which makes it possible to prevent the dropping of the glass plate at the time of the carrying in and out of the glass plate, and which make it possible to prevent damage or the like from being caused to the coated surface at the time of working the glass plate whose upper surface is coated.

The invention claimed is:
1. An apparatus for working a glass plate, comprising:
a glass-plate working section for working a glass plate; and
transporting means for carrying into said glass-plate working section the glass plate to be worked by imparting a moving force in one direction to a lower surface of the glass plate, and for carrying out the glass plate from said glass-plate working section after working;

said glass-plate working section having at least one work section of a cutting work section for forming a cut line on the glass plate, a bend-breaking work section for bend-breaking along the cut line the glass plate on which the cut line has been formed, and a grinding work section for grinding a peripheral edge of the bend-broken glass plate;

said transporting means being disposed in such a manner as to pass through a center of said glass-plate working section, and being adapted to carry into said work section the glass plate in a state of being held at a center of the lower surface thereof and to carry out the worked glass plate from said work section in synchronism with the carrying in.

2. The apparatus for working a glass plate according to claim 1, wherein said cutting work section, said bend-breaking work section, and said grinding work section respectively have supporting means for supporting the glass plate, and each of said supporting means has a pair of supporting devices opposing each other with said transporting means placed therebetween.

3. The apparatus for working a glass plate according to claim 2, wherein said cutting work section is adapted to form a main cut line and an edge cut line on the glass plate, and said edge cut line is adapted to be formed in an area of the glass plate located between at least said pair of supporting devices.

4. The apparatus for working a glass plate according to claim 2, wherein said pair of supporting devices of at least one of said cutting work section and said bend-breaking work section respectively have endless belts on which the glass plate is placed, and traveling means for causing said endless belts to travel in said one discretion.

5. The apparatus for working a glass plate according to claim 4, wherein said cutting work section and said bend-breaking section mutually share said endless belt of each of said pair of supporting devices, and are respectively adapted to form the main cut line and the edge cut line on the glass plate placed in a cutting work area on said endless belts of said cutting work section, and to bend-break along the main cut line the glass plate on which the main cut line and the edge cut line have been formed and which is placed in a bend-breaking work area on the endless belts of said bend-breaking work section.

6. The apparatus for working a glass plate according to claim 4, wherein, when the glass plate is carried into and out from said cutting work section and said bend-breaking work section, transporting by said transporting means and traveling of said endless belts disposed on both sides of said transporting means are adapted to proceed synchronously and proceed at the same speed.

7. The apparatus for working a glass plate according to claim 4, wherein, when the glass plate is carried into and out from said cutting work section and said bend-breaking work section, said endless belts disposed on both sides of said transporting means are adapted to support the glass plate and transport and carry in the glass plate together with said transporting means.

8. The apparatus for working a glass plate according to claim 1, wherein said transporting means has holding means for holding the glass plate from the lower surface thereof and moving means for moving said holding means in said one direction.

9. The apparatus for working a glass plate according to claim 8, wherein said transporting means has vertically moving means for raising or lowering said holding means.

10. The apparatus for working a glass plate according to claim 1, wherein said grinding work section has vacuum suction units disposed on both sides of a passage of said transporting means in a sandwiching manner, and the glass plate is adapted to be fixed by said vacuum suction units on both sides at the time of the grinding working.

11. The apparatus for working a glass plate according to claim 1, wherein an upper surface of the glass plate is coated.

12. The apparatus for working a glass plate according to claim 8, wherein said moving means has a screw shaft which is disposed in such a manner as to pass through said center of said glass-plate working section, a slider threadably engaged with the screw shaft and an electric motor for rotating the screw shaft, said holding means being attached to the slider.

13. An apparatus for working a glass plate, comprising:

a glass-plate working section to work a glass plate; and a transport to carry into said glass-plate working section the glass plate to be worked by imparting a moving force in one direction to a lower surface of the glass plate, and to carry out the glass plate from said glass-plate working section after working;

said glass-plate working section having at least one work section of a cutting work section to form a cut line on the glass plate, a bend-breaking work section to bend-break along the cut line the glass plate on which the cut line has been formed, and a grinding work section to grind a peripheral edge of the bend-broken glass plate;

said transport being disposed in such a manner as to pass through a center of said glass-plate working section, and being adapted to carry into said work section the glass plate in a state of being held at a center of the lower surface thereof and to carry out the worked glass plate from said work section in synchronism with the carrying in.

* * * * *